United States Patent
Eiberger et al.

[11] Patent Number: 6,078,354
[45] Date of Patent: *Jun. 20, 2000

[54] TELECINE SCANNING

[75] Inventors: Berthold Eiberger, Ober-Ramstadt; Rudolf Wulf, Riedstadt, both of Germany

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/824,397

[22] Filed: Mar. 26, 1997

[30] Foreign Application Priority Data

Mar. 30, 1996 [DE] Germany ............... 196 12 880

[51] Int. Cl.$^7$ ........................................... H04N 9/47
[52] U.S. Cl. ............... 348/96; 226/87; 396/387; 396/440; 352/188
[58] Field of Search ............... 348/96, 97; 352/160–163, 352/221–231; 396/415

[56] References Cited

U.S. PATENT DOCUMENTS

| | | | |
|---|---|---|---|
| 3,602,417 | 8/1971 | Bennet | 226/199 |
| 4,451,030 | 5/1984 | Teeter et al. | 271/265 |
| 5,266,979 | 11/1993 | Brown et al. | 352/224 |
| 5,430,477 | 7/1995 | Bachmann et al. | 348/97 |
| 5,682,200 | 10/1997 | Schilling | 348/97 |
| 5,682,566 | 10/1997 | Nakazawa et al. | 396/415 |
| 5,734,171 | 3/1998 | Witte | 348/97 |

FOREIGN PATENT DOCUMENTS

| | | |
|---|---|---|
| 0542551A1 | 5/1993 | European Pat. Off. . |
| 436969 | 11/1967 | Germany . |
| 2633133A1 | 1/1978 | Germany . |
| 344505 | 7/1978 | Germany . |

*Primary Examiner*—Howard Britton
*Assistant Examiner*—Shawn S. An
*Attorney, Agent, or Firm*—Gregory L. Thorne

[57] ABSTRACT

A telecine scanner, with which the horizontal picture steadiness errors are reduced by the film guidance in the area of the film gate 5, includes a first guiding element 11 supporting one of the longitudinal edges of the film 4 at at least two points in the film gate 5 in the area of the radiation path 6. In addition, two guiding elements 12 are provided, which are spaced substantially centrically apart from the first guiding element 11 and engage the other longitudinal edge of the film 4.

10 Claims, 1 Drawing Sheet

TELECINE SCANNING

BACKGROUND OF THE INVENTION

1. Field of the Invention

The subject invention relates to telecine scanners, which convert pictures on film into video signals.

2. Description of the Related Art

In telecine scanning, the film is transported between a light source and an opto-electronic sensor which consists of, for example CCD image sensors. The film is guided along its transport direction on a curved track in its plane of sharpness, i.e., in the area of the radiation path. For this purpose, curved runners are provided in the area of the film gate, on which the film outside the frames is supported and glides (see, for example DE Patent Application 195 40 005.4). Transversely to the transport direction, the film glides in the plane of sharpness punctually with one of its longitudinal sides on a guiding element which generally consists of a friction-resistant ceramic material. To ensure that the film is supported on its longitudinal side by the guiding element, a spring-supported roll or runner engages the other longitudinal side of the film.

An essential drawback of the display quality of films in television as against electronic camera recordings are visible horizontal and vertical picture steadiness errors (film weave). These errors may be caused, inter alia, by tolerances in the film material itself.

SUMMARY OF THE INVENTION

It is therefore an object of the present invention to provide a telecine scanner with which the horizontal picture steadiness errors are reduced.

According to the invention, this object is solved in that at least a first guiding element supporting one of the longitudinal sides of the film at at least two points is provided in the area of the radiation path.

In accordance with a further embodiment of the invention, the position of this guiding element is three-dimensionally adjustable.

The object is further solved in that at least two guiding elements spaced substantially centrically apart from the first guiding element engage the other longitudinal side of the film.

The invention has the advantage that horizontal picture steadiness errors can be essentially reduced by averaging irregularities at the edges of the film material by means of a multipoint guidance arranged in the area of the radiation path of the film.

These and other aspects of the invention will be apparent from and elucidated with reference to the embodiments described hereinafter.

In the drawing.

Identical parts shown in both Figures have identical reference numerals.

DESCRIPTION OF THE PREFERRED EMBODIMENT

Figure 1:
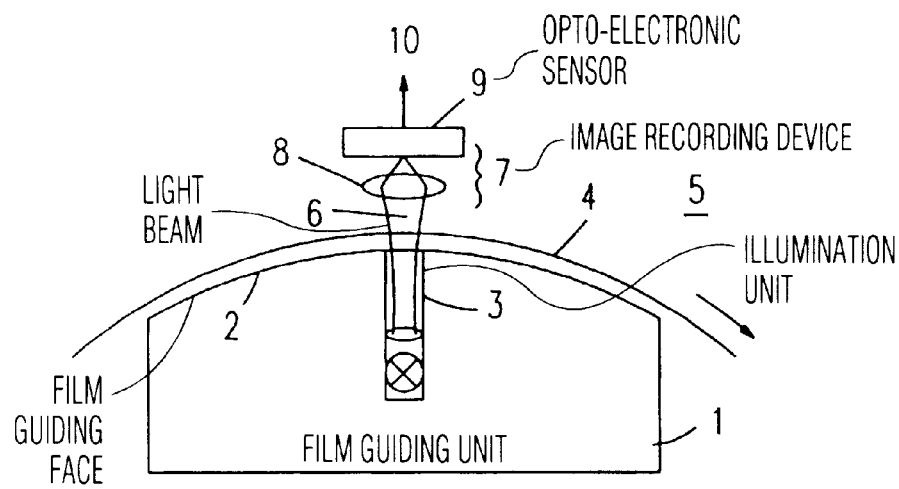
FIG. 1 shows a telecine scanner, representing the film gate area.

FIG. 1 shows, diagrammatically, a known film gate 5 which essentially consists of a film guiding unit 1 having a curved film guiding face 2, and an illumination unit 3. A film 4 is transported in the direction of the arrow along the curved film guiding face 2 and illuminated by means of a light beam 6 generated by the illumination unit 3. The side of the film 4 facing the illumination unit 3 is provided with an image recording device 7 consisting of an optical system 8 and an opto-electronic sensor 9. The light beam 6 modulated by the film contents is imaged, via the optical system 8, on the light-sensitive area of the sensor 9 which converts this optical information into an electric image signal which can be derived at the output 10.

Figure 2:
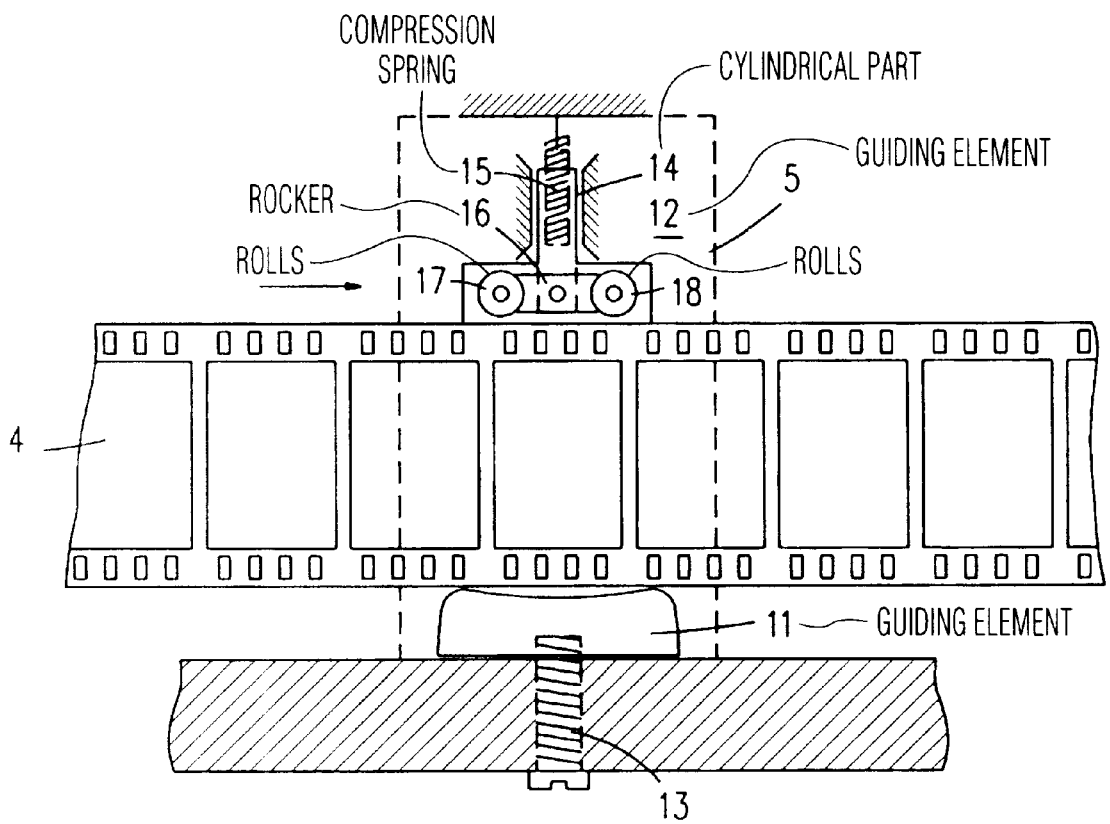
FIG. 2 shows a device for guiding the film.

FIG. 2 shows the film guiding device according to the invention, consisting of the film guiding unit 1 with the curved film guiding face 2 shown in FIG. 1, in which device the film 4 is transported through the film gate 5 in the direction of the arrow. Guiding elements 11 and 12, according to the invention, are provided at both sides of the film 4 in the area of the film gate 5 and the radiation path 6, respectively. A first ceramic material guiding element 11 having a concave shape in the direction of the film edge is provided on one of the longitudinal sides of the film 4, with the film edge being supported by, or gliding on, the two projections of this guiding element. The first film guiding element 11 is three-dimensionally adjustable by means of a screw 13.

A second guiding element 12—spaced centrically apart from the first guiding element 11—is arranged in a diametrically opposite position at the other longitudinal edge of the film 4 which this second guiding element 12 engages. This second guiding element 12 consists of a cylindrical part 14 comprising a compression spring 15 which is active in the direction of the other film edge, while a rocker 16, with rolls 17 and 18 being pivoted to its ends, is swivably journaled at the film-sided end of the cylindrical part 14. These rolls 17, 18 engage the other film edge due to the spring force, so that the film edge is urged against the two contact points of the first guiding element 11. Irregularities of the film edges, which may lead to horizontal picture steadiness errors, are thus averaged out.

What is claimed is:

1. A telecine scanner having a light source and an opto-electronic sensor, in which film is transported in a radiation path between the light source and the opto-electronic sensor and is guided transversely to the transport direction, characterized in that said telecine scanner comprises at least a first guiding element for contacting one of the longitudinal edges of the film at least at two distinct non-continuous points in the area of the radiation path.

2. A telecine scanner as claimed in claim 1, characterized in that said telecine scanner comprises means for adjusting a position of the first guiding element three-dimensionally.

3. A telecine scanner as claimed in claim 1, characterized in that said telecine scanner further comprises at least two second guiding elements spaced substantially centrically apart from the first guiding element, said at least two second guiding elements engaging the other longitudinal side of the film.

4. A telecine scanner as claimed in claim 3, characterized in that the second guiding elements comprise two rolls secured to a spring-supported rocker.

5. A telecine scanner as claimed in claim 1, wherein the first guiding element is concave shaped with respect to an outer longitudinal edge of the film.

6. A telecine scanner, in which the film is transported in the radiation path between a light source and an optoelectronic sensor and is guided transversely to the transport direction, wherein a first guiding element is configured to contact an outer longitudinal edge of the film in the area of the radiation path and is concave shaped with respect to said outer longitudinal edge of the film.

7. A telecine scanner as claimed in claim 6, wherein the position of the first guiding element is three-dimensionally adjustable.

8. A telecine scanner as claimed in claim 6, comprising at least two second guiding elements spaced substantially centrically apart from the first guiding element and configured to engage an other longitudinal edge of the film.

9. A telecine scanner as claimed in claim 8, comprising a spring-support ed rocker, wherein the second guiding elements comprise two rolls secured to the spring-supported rocker.

10. The telecine scanner as claimed in claim 6, wherein the first guiding element is configured to support the outer longitudinal edge of film in at least two points.

* * * * *